Patented Nov. 10, 1953

2,658,876

UNITED STATES PATENT OFFICE 2,658,876

DIAZO THIOETHERS AS BLOWING AGENTS IN PRODUCTION OF SPONGE RUBBER AND THE LIKE

William B. Reynolds, Bartlesville, Okla., assignor to Phillips Petroleum Company, a corporation of Delaware No Drawing. Application May 20, 1948, Serial No. 28,280

21 Claims. (Cl. 260—2.5)

This invention relates to sponge, foam, or cellular rubber, any of which can be referred to as "blown" rubber. The invention also relates to a new process for producing sponge, foam, or cellular, or blown, rubber.

Numerous methods have been employed for the production of sponge rubber, one of which involves incorporating into the rubber a material which will decompose when subjected to heat, thereby liberating a gas which will cause the rubber to expand and assume a cellular form. Among the agents used in this capacity, known as "sponging agents" or "blowing agents", sodium bicarbonate is commonly employed, its chief advantages being its availability and low cost, but it fails to meet many of the requirements of a good sponging or blowing agent. Uniform dispersion of sodium bicarbonate in the rubber is difficult to attain and the product which results has uneven, coarse cells. Ammonium carbonate has also been employed in the production of sponge rubber. It is more drastic in its action than sodium bicarbonate and exerts a high pressure when heated but its tendency to reform on cooling may cause the collapse of the cellular structure.

I have now found a method whereby sponge rubber of uniform pore size and fine texture may be produced through the use of diazo thioethers as blowing agents. The blowing agents used in this invention impart a high ratio of expansion to the rubber, are readily incorporated into the rubber to give a uniform dispersion, and will provide firm products which are not harsh to the touch.

One object of this invention is to produce sponge, foam, and cellular rubber.

A further object of this invention is to blow rubber.

Another object of this invention is to provide a method for the production of sponge rubber from natural rubber.

A further object of this invention is to provide a method for the production of sponge rubber from synthetic rubber.

Another object of this invention is to expand and produce foam rubber from a rubber latex.

Still another object of this invention is to produce a sponge, foam, or cellular, rubber of uniform pore size.

A still further object of my invention is to produce a sponge, foam, or cellular rubber of fine texture.

Further objects and advantages of my invention will become apparent, to one skilled in the art, from the accompanying disclosure and discussion.

The diazo thioethers, used in the practice of this invention, have the general structural formula R—N=N—S—R', where R is an aromatic radical and R' is a member of the group consisting of the aromatic, cycloalkyl, and aliphatic radicals. These diazo thioethers may be made by the combination of a diazotized aromatic amine and an aromatic, cycloalkyl or aliphatic mercaptan, including substituted derivatives thereof. Preferred substituent groups are the alkyl, alkoxy, aryloxy (e. g., phenoxy), carboxy, sulfo ($SO_3H$), halo, and nitro groups. It is to be understood that such substituent groups may be present in R and/or R' in the above general formula. It is also to be understood that this invention is not concerned with the preparation of diazo thioethers and is not limited to any particular method of synthesis but pertains to the use of these materials as blowing agents in sponge rubber manufacture.

Typical examples of blowing agents used in this invention comprise the following, the list being primarily illustrative, but not unduly limiting to the scope of the invention: 2-(4-methoxybenzene diazo mercapto)-naphthalene, 1-(4-methoxybenzene diazo mercapto)-naphthalene, 2-(2,4-dimethylbenzene diazo mercapto)-naphthalene, 1-(2,4-dimethylbenzene diazo mercapto)-naphthalene, 4-(2,4-dimethylbenzene diazo mercapto)-naphthalene, sodium salt of 2-(4-methoxybenzene diazo mercapto)-benzoic acid, sodium salt of 2-(4-sulfobenzene diazo mercapto)-naphthalene, sodium salt of 4-(4-sulfobenzene diazo mercapto)-toluene, sodium salt of 2-(2-naphthalene diazo mercapto)-benzoic acid, and the like. Usually only one diazo thioether will be used at any one time, but mixtures of such thioethers may be used, when desirable or expedient.

The diazo thioether blowing agents are applicable in either natural or synthetic rubber stocks to produce sponge rubber, and they may also be employed in latex, either natural or synthetic, to produce foam rubber. Herein and in the claims the term "rubber" includes both natural and synthetic rubbers and the term "latex" includes both natural and synthetic latices. The diazo thioethers may be introduced by any conventional method. For example, they may be dissolved in any suitable solvent, such as benzene, and added to the latex or they may be incorporated into the rubber composition on a mill. They are applicable in numerous compounding recipes and may be employed in either the presence or absence of carbon black.

The amount of blowing agent may be varied, depending upon the particular diazo thioether used as well as upon the amount of blow desired. Larger proportions of the additive are introduced in instances where a greater amount of blow is desired. In general, a relatively small proportion of diazo thioether is used, e. g., 0.5 to 10 per cent of the rubber stock, preferably 1.5 to 5 per cent, but larger amounts may be added in cases where it is advantageous to do so. The diazo thioether is generally incorporated uniformly in the rubber, or latex, to be blown. Thereafter the mixture is heated, usually in a mold, to a temperature sufficient to effect a decomposition of the diazo thioether, whereby gaseous decomposition products are released and the rubber material is expanded. This decomposition temperature should not be so high as to effect adversely the rubber material, but when vulcanization is concomitantly effected the temperature should be sufficiently high to effect both blowing and vulcanization, and frequently the specific diazo thioether used will have to be chosen with these factors in mind. A suitable temperature for this step of the process will generally be found between 90 and 200° C. The heating should be for a time between 5 and 60 minutes, preferably 20 to 30 minutes. When such heating of the compounded mixture is carried out with the mixture in a mold the mold is usually only partially filled, e. g. about one-third to one-half full of the mixture. If a latex is mechanically frothed, to include small bubbles of air or other gas, such a froth may be used to fill the mold completely.

A further advantage of the use of a diazo thioether as a blowing agent in the process of this invention lies in the fact that diazo thioethers are vulcanization accelerators, and hence perform that function in addition to their role as blowing agents. The necessity of using additional accelerators is thus eliminated. Diazo thioethers are also employed as initiators and modifiers in polymerization recipes, in the production of synthetic rubber. When synthetic rubber is produced from formulations in which diazo thioethers are employed, the diazo thioether already present may serve as a blowing agent in the manufacture of foam or sponge rubber, if it is present, as such, in the final polymer product in sufficient relative amount. In cases where an additional amount of this additive is considered desirable, such quantities as are necessary may be introduced prior to the blowing operation. If it is desired to produce an unvulcanized sponge rubber, the diazo thioether blowing agent may be admixed with raw rubber, without or with the concomitant admixture of other ingredients. This procedure can be used, for example, when nonvulcanizable synthetic rubber is to be blown. However, it is generally preferable to effect vulcanization of the rubber at the same time, and in such cases there is added, along with the diazo thioether blowing agent, the other ingredients which it is desired to incorporate in the rubber. In these instances, blowing and vulcanization occur together and the resulting sponge, foam, or cellular rubber product is also a vulcanized product. Since, as mentioned, diazo thioethers are vulcanization accelerators also, usual accelerators may be omitted, or used in less-than-normal amount. When a diazo thioether is used in very small concentration, its effect as a vulcanization accelerator may exceed its effect as a blowing agent.

Advantages of this invention are illustrated by the following examples. The reactants, and their proportions, and the other specific ingredients of the recipes are presented as being typical and should not be construed to limit the invention unduly.

Example I

Compounding of a synthetic rubber base stock is effected according to the following recipe:

| | Parts by weight |
|---|---|
| GR–S rubber stock | 100 |
| Santocure [1] | 0.5 |
| Calcined magnesia | 4 |
| Whiting | 60 |
| Carbon black (Philblack A) | 15 |
| Phenyl-beta-naphthylamine | 2 |
| Petroleum softener | 20 |
| Stearic acid | 2 |
| Zinc oxide | 5 |
| 2-(4-methoxybenzene diazo mercapto)-naphthalene | 3 |

[1] N-cyclohexyl-2-benzothiazole sulfenamide.

When molds of suitable capacity are one-third to one-half filled with the compounded stock and heated at 150 to 155° C. under a steam pressure of 60 pounds per square inch gauge for 20 to 30 minutes, the molds are completely filled and the resulting products have fine, uniform pores and are firm but not harsh to the touch. Similar results are obtained when the diazo thioether employed is 1-(4-methoxybenzene diazo mercapto)-naphthalene.

Example II

A GR–S rubber base stock is compounded according to the following recipes:

| | Parts by weight |
|---|---|
| GR–S rubber stock | 100 |
| RPA #5 [1] | 2 |
| Stabilite [2] | 2 |
| Carbon black (Philblack A) | 20 |
| Clay | 40 |
| Whiting | 20 |
| Zinc oxide | 5 |
| Petroleum softener | 60 |
| Sulfur | 2 |
| Stearic acid | 5 |
| 2-(4-methoxybenzene diazo mercapto)-naphthalene | 2 |

[1] 50% zinc salt of an aryl mercaptan and 50% neutral solvent.
[2] N,N'-diphenyl ethylenediamine.

Heating of the compounded material as in Example I yields a soft sponge. Similar results are obtained when the diazo thioethers employed are 2-(4-methylbenzene diazo mercapto)-naphthalene and 2-(2,4-dimethylbenzene diazo mercapto)-naphthalene, respectively.

Example III

A firm sponge is prepared from a GR–S rubber stock by using the following compounding recipe:

| | Parts by weight |
|---|---|
| GR–S | 100 |
| RPA #5 [1] | 2 |
| Stabilite [2] | 2 |
| Carbon black (Philblack A) | 20 |
| Clay | 80 |
| Whiting | 20 |
| Zinc oxide | 5 |
| Petroleum softener | 5 |
| Stearic acid | 5 |
| Sulfur | 2 |
| 2-(4-methoxybenzene diazo mercapto)-naphthalene | 2 |

[1] 50% zinc salt of an aryl mercaptan and 50% neutral solvent.
[2] N,N'-diphenyl ethylenediamine.

Heating is effected under conditions described in Example I. When 2-(4-methylbenzene diazo mercapto)-naphthalene and 2-(2,4-dimethylbenzene diazo mercapto)-naphthalene are the diazo thioethers employed, comparable results are obtained. Similar results are also produced when 2-(4-chlorobenzene diazo mercapto)-2-methyl propane is used as the blowing agent.

*Example IV*

A natural rubber base stock is compounded according to the following recipe:

| | Parts by weight |
|---|---|
| Smoked sheet | 100 |
| Zinc oxide | 5 |
| Whiting | 30 |
| Phenyl-beta-naphthylamine | 2 |
| Santocure [1] | 0.5 |
| Petroleum softener | 20 |
| Stearic acid | 4 |
| Sulfur | 2 |
| 2-(4-methoxybenzene diazo mercapto)-naphthalene | 1.5 |

[1] N-cyclohexyl-2-benzothiazole sulfenamide.

The stock is cured by heating at a temperature of 160° C. for twenty minutes under a steam pressure of 65 pounds per square inch gauge. A mold which is half filled at the beginning of the operation is completely filled after the stock is cured. The product is firm but not harsh and has fine, uniform pores.

When three other batches of compounded rubber stock are prepared as above except that the diazo thioethers employed are 1-(4-methoxybenzene diazo mercapto)-naphthalene, 2-(4-methylbenzene diazo mercapto)-naphthalene, and 2-(2,4-dimethylbenzene diazo mercapto)-naphthalene, respectively, similar results are obtained.

*Example V*

Foam rubber is prepared from a sample of GR–S latex which is mechanically frothed, by intimate mixing with air, to about six times its original volume and then admixed with a material comprising compounding, blowing, gelling, and vulcanizing ingredients. This latter material is prepared in the following manner:

| | Parts by weight |
|---|---|
| Water | 50 |
| Phenyl-beta-naphthylamine | 0.5 |
| Piperidinium pentamethylene dithiocarbamate | 4.5 |
| Zinc oxide | 20 |
| Sulfur | 10 |
| Zinc mercaptobenzothiazole | 5.5 |
| Agerite white [1] | 6 |

[1] Di-beta-naphthyl-para-phenylene diamine.

The water is heated to 80 to 85° C., the phenyl-beta-naphthylamine and piperidinium pentamethylene dithiocarbamate added, and the mixture placed in a ball mill after which the zinc oxide, sulfur, zinc mercaptobenzothiazole, and "agerite white" are introduced. The ingredients are milled until a uniform paste is obtained. In order to prevent foaming during the milling operation, the ball mill is filled to maximum capacity. To 100 parts of the paste is added 5 parts of the sodium salt of 4-(4-sulfobenzene diazo mercapto)-toluene and 2.5 parts ammonium nitrate in the form of a 50 per cent aqueous solution. This mixture is stirred until a uniform dispersion is produced.

The compounding mixture prepared as described (2 parts) is added to 10 parts of latex frothed to about six times its original volume, and this mixture is poured into a mold which has been warmed to a temperature of 65° C. The temperature is increased to 85–90° C. to hasten gelling of the latex and cause the frothed rubber to expand and fill the mold completely. The slight pressure, caused by the freed gases, is maintained until a stiff gel is produced after which the latex is vulcanized by heating the mold to 100° C. for about an hour.

The GR–S rubber stock referred to in some of the foregoing examples, is, as is well known to those skilled in the art, a synthetic rubber produced by emulsion copolymerization of a monomeric mixture of 1,3-butadiene (70–75%) and styrene (25–30%). This material was produced in large quantities under government direction by many organizations.

As will be evident to those skilled in the art, various modifications of this invention can be made, or followed, in the light of the foregoing disclosure and discussion, without departing from the spirit or scope of the disclosure or from the scope of the claims.

I claim:

1. In the preparation of a blown rubber product wherein there is admixed with the material from which the product is made a blowing agent which is decomposed in said material during the preparation of the product to cause an internal blowing effect to aid in the formation of the product, the steps which comprise incorporating 0.5 to 10 per cent of a diazo thioether blowing agent in said material, said agent having the general formula R—N=N—S—R', wherein R is an aromatic radical and R' is a member of the group consisting of aromatic, cycloalkyl and aliphatic radicals and then causing the decomposition of said agent.

2. In the preparation of a blown rubber product wherein there is admixed with the latex from which the product is made a glowing agent which is decomposed in said latex during the preparation of the product to cause an internal blowing effect to aid in the formation of the product, the steps which comprise incorporating 0.5 to 10 per cent of a diazo thioether blowing agent in said latex, said agent having the general formula R—N=N—S—R', wherein R is an aromatic radical and R' is a member of the group consisting of aromatic, cycloalkyl and aliphatic radicals and then causing the decomposition of said agent.

3. A process according to claim 2 wherein the latex is a synthetic latex.

4. A process according to claim 3 wherein the quantity of the diazo thioether incorporated is in the approximate range 0.5 to 10% by weight of the rubber in said latex and the admixture is heated to a temperature in the approximate range 90 to 200° C. to cause the decomposition of said diazo thioether and for a time sufficient to cause the formation of said product, said agent having the general formula R—N=N—S—R', wherein R is an aromatic radical and R' is a member of the group consisting of aromatic, cycloalkyl and aliphatic radicals.

5. A process according to claim 4 wherein a froth is first formed by admixing a gas with said latex.

6. A process according to claim 2 wherein the latex is a natural latex.

7. A process according to claim 6 wherein the quantity of the diazo thioether incorporated is in the approximate range 0.5 to 10% by weight of the rubber in said latex and the admixture is heated to a temperature in the approximate range 90 to 200° C. to cause the decomposition of said diazo thioether and for a time sufficient to cause the formation of said product, said agent having the general formula R—N=N—S—R', wherein R is an aromatic radical and R' is a member of the group consisting of aromatic, cycloalkyl and aliphatic radicals.

8. A process according to claim 7 wherein a froth is first formed by admixing a gas with said latex.

9. In the preparation of a blown rubber product wherein there is admixed with the rubber from which the product is made a blowing agent which is decomposed in said rubber during the preparation of the product to cause an internal blowing effect to aid in the formation of the product, the steps which comprise incorporating 0.5 to 10 per cent of a diazo thioether blowing agent in said rubber, said agent having the general formula R—N=N—S—R', wherein R is an aromatic radical and R' is a member of the group consisting of aromatic, cycloalkyl and aliphatic radicals and then causing the decomposition of said agent.

10. A process according to claim 9 wherein the rubber is a synthetic rubber.

11. A process according to claim 10 wherein the quantity of the diazo thioether incorporated is in the approximate range 0.5 to 10% by weight of the rubber and the admixture is heated to a temperature in the approximate range 90 to 200° C. to cause the decomposition of said diazo thioether and for a time sufficient to cause the formation of said product, said agent having the general formula R—N=N—S—R', wherein R is an aromatic radical and R' is a member of the group consisting of aromatic, cycloalkyl and aliphatic radicals.

12. A process according to claim 9 wherein the rubber is a natural rubber.

13. A process according to claim 12 wherein the quantity of the diazo thioether incorporated is in the approximate range 0.5 to 10% by weight of the rubber and the admixture is heated to a temperature in the approximate range 90 to 200° C. to cause the decomposition of said diazo thioether and for a time sufficient to cause the formation of said product, said agent having the general formula R—N=N—S—R', wherein R is an aromatic radical and R' is a member of the group consisting of aromatic, cycloalkyl and aliphatic radicals.

14. A process according to claim 1 wherein said diazo thioether is 2-(4-methoxybenzene diazo mercapto)-naphthalene.

15. A process according to claim 1 wherein said diazo thioether is 1-(4-methoxybenzene diazo mercapto)-naphthalene.

16. A process according to claim 1 wherein said diazo thioether is a 2,4-dimethylbenzene diazo mercapto-napthalene.

17. A process according to claim 1 wherein said diazo thioether is 2-(2,4-dimethylbenzene diazo mercapto)-naphthalene.

18. A process according to claim 9 wherein the rubber is a butadiene-styrene synthetic rubber.

19. In the preparation of a blown product from a rubber selected from the group consisting of natural rubber and a butadiene-styrene rubber wherein there is admixed with the material from which the product is made a blowing agent which is decomposed in said material during the preparation of the product to cause an internal blowing effect to aid in the formation of the product, the steps which comprise incorporating 0.5 to 10 per cent of a diazo thioether blowing agent in said material, said agent having the general formula R—N=N—S—R', wherein R is an aromatic radical and R' is a member of the group consisting of aromatic, cycloalkyl and aliphatic radicals and causing the decomposition of said agent therein.

20. A process according to claim 1 wherein said diazo thioether is 2-(4-methylbenzene diazo mercapto)-naphthalene.

21. A process according to claim 1 wherein said diazo thioether is 2-(4-chlorobenzene diazo mercapto)-2-methylpropane.

WILLIAM B. REYNOLDS.

References Cited in the file of this patent

UNITED STATES PATENTS

| Number | Name | Date |
|---|---|---|
| 2,261,459 | Cooper et al. | Nov. 4, 1941 |
| 2,284,578 | Jones | May 26, 1942 |
| 2,299,593 | Roberts et al. | Oct. 20, 1942 |
| 2,303,691 | Harman | Dec. 1, 1942 |
| 2,335,730 | Blake | Nov. 30, 1943 |
| 2,448,154 | Richmond et al. | Aug. 31, 1948 |
| 2,469,819 | Flory et al. | May 10, 1949 |
| 2,471,742 | Harrison | May 31, 1949 |